No. 827,397. PATENTED JULY 31, 1906.
F. H. SCHAUFFLER.
TESTING INSTRUMENT.
APPLICATION FILED JUNE 9, 1905.
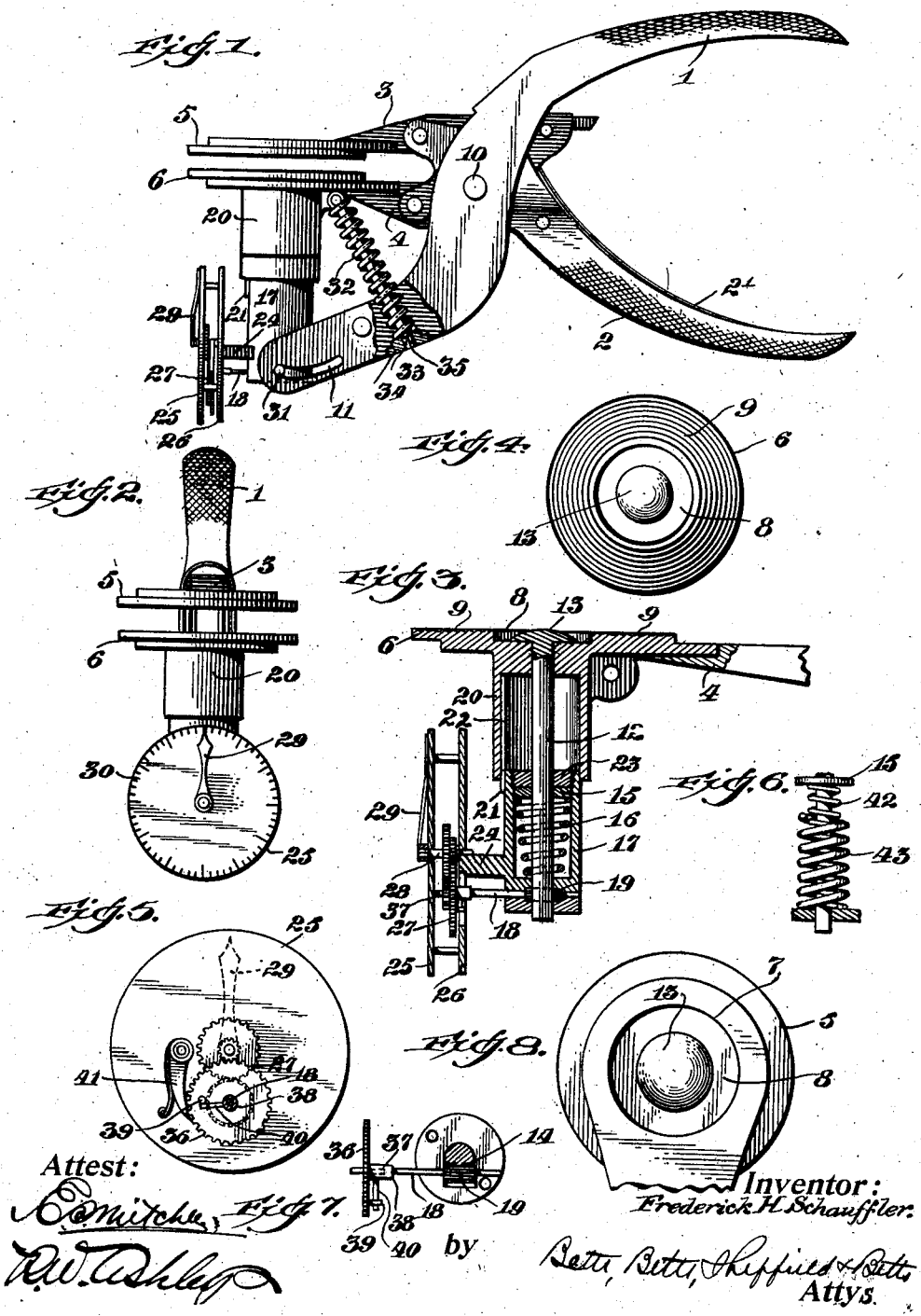
Attest:
Inventor:
Frederick H. Schauffler.
by
Attys.

UNITED STATES PATENT OFFICE.

FREDERICK H. SCHAUFFLER, OF NEW YORK, N. Y.

TESTING INSTRUMENT.

No. 827,397.  Specification of Letters Patent.  Patented July 31, 1906.

Application filed June 9, 1905. Serial No. 264,414.

*To all whom it may concern:*

Be it known that I, FREDERICK H. SCHAUFFLER, a citizen of the United States, and a resident of the city of New York, in the county and State of New York, have invented certain new and useful Improvements in Testing Instruments, of which the following is a full, clear, and complete disclosure.

My invention relates particularly to improvements in an instrument or tool for testing different materials, and particularly for testing the strength of paper and other sheet material.

The object of my invention is not only to produce an instrument which is efficient and accurate as a testing device, but also to produce an instrument which is easily handled, is portable, and which may be conveniently applied to the material to be tested, whether stationary or in motion on a machine.

Briefly, my invention comprises a clamping means or vise by which material to be tested is held in position, said clamping means operating in connection with a member for producing a tension upon the paper and a disruption thereof, said member being connected with a suitable registering device which indicates the tension at which the disruption takes place.

For a full, clear, and exact description of one form of my invention, which I at present deem most efficient and a preferable embodiment, reference may be had to the following specification and to the accompanying drawings, forming a part thereof, in which—

Figure 1 is a side elevation, partly in section, of my improved instrument; Fig. 2, an end elevation thereof; Fig. 3, a longitudinal sectional view of one member of the clamping device, the tension member, and the registering means; Fig. 4, a plan view showing the face of one of the clamping-jaws of the vise or clamp; Fig. 5, a transverse sectional view showing the gearing for operating the registering device. Fig. 6 is a detached detail view of the modified form of tension-spring for operating the tension member. Fig. 7 is a transverse sectional view of one end of the tension device, illustrating its connection with the registering means; and Fig. 8 is a top plan view of the clamping device, showing its relation to the tension member.

Referring to the drawings, the numerals 1 and 2 indicate two of the component members of a hand-clamp, which in this instance is in the form of a pair of pliers or nippers having the parallelly-actuated extensions 3 and 4. To these extensions 3 and 4 are attached a pair of clamping plates or jaws 5 and 6, which are provided with central openings 7 and 8, said plates 5 and 6 being also provided with concentric grooves 9, which form ridges, said grooves being located upon the plates 5 and 6, respectively, so as to intermesh or interlock with each other. The member 1 of the hand-clamp is also extended beyond its pivot 10 and is provided at its outer end with a slot or groove 11, which is adapted to operate the tension member, as hereinafter to be more fully described.

Through the bottom of the recess or opening 8 in the plate 5 passes a plunger or bar 12, forming a tension member, which is provided at the end which rests within the recess 8 with a curved or semicircular head 13 and at its outer end is provided with a toothed rack, as indicated at 14. Said plunger 12 is provided with a stop or collar 15 intermediate its ends, against which rests one end of a compression-spring 16. The plunger 12 is also surrounded by a cylindrical casing 17, closed at both ends, except for openings through which the plunger passes, its outer end being provided with bearings for a shaft 18, which carries a pinion 19, adapted to mesh with the rack 14 on the plunger 12. The casing 17 is adapted to telescope with a similar casing 20, attached to and extending outwardly from the clamping plate or member 6 and in axial line with the recess or opening 8. The telescoping casings 17 and 20 are provided, respectively, with a key 21 and a groove 22 for preventing said casings from turning or rotating in relation to each other, but allowing a relative longitudinal movement, thus forming guides for the plunger 12. The inner end of the cylindrical casing 17 is provided with a screw-threaded plug 23, which limits the movement of the stop 15 when pressed inwardly by the spring 16, the other end of said spring being arranged to rest against the closed outer end of the casing 17. The casing 17 also carries a laterally-projecting support or standard 24, which carries at its outer end the registering mechanism. This comprises two plates 25 and 26, between which the multiplying train of gears 27 is located, said gears terminating in a shaft 28, which carries at its outer end a finger or indicating-hand 29, adapted to coöperate with a scale 30, provided on the face of the plate 25.

Attached to the exterior casing 17 and adjacent the outer end thereof are two pins 31, placed diametrically opposite each other, said pins being of sufficient length to engage the slots 11 in the end of the outward extension of the member 1 of the hand-clamp. A compression-spring 32, which surrounds the retaining-rod 33, has one end located so as to bear against and exert pressure upon the under side of the clamping member 6, the opposite end of said spring 32 being so located as to rest against a transverse bar or brace 34, which is provided with an opening through which the rod 33 passes. Said rod is provided with a suitable stop consisting of a transverse pin 35, which limits the outward movement of the member 1 in relation to the plate 6 and is also pivoted at its inner end to the plate or jaw 6. It will be seen that this compression-spring 32 tends to keep the casing 17 in its outer position in relation to the casing 20. A spring 2', connected with the member 2, tends also to keep the jaws 3 and 4 and the plates 5 and 6 separated.

A special feature of the registering mechanism resides in the arrangement of its connections with the shaft 18. The gear 36, forming the first gear in the train 27, is provided with a short stub-shaft 37, which enters a sleeve or socket 38, carried on the end of the shaft 18. Said gear 36 is also provided with a transversely-projecting pin 39, which is adapted to engage a lug or projection 40, carried on the sleeve 38. These parts form a clutch between the tension member and the registering mechanism. It will now be seen that as the shaft 18 rotates in one direction the lug 40 will contact with and carry along the pin 39, thereby rotating the gear 36 as long as the rotation of the lug 40 continues. When the rotation of the shaft 18 ceases and its motion commences in the opposite direction, the lug 39 will then remain at the limit of movement which it had in the opposite direction without being affected by the reverse movement of the shaft 18 and the corresponding lug 40. It will thus be seen that the limit of outward movement of the bar or plunger 12 in relation to the casing 17 will be indicated by the hand 29, according to the scale 30 upon the plate 25.

Since the movement of the plunger in relation to the casing 17 before the material being tested is ruptured is comparatively small, the shaft 18 will ordinarily be required to be rotated for less than one revolution. It is obvious, however, that if it is necessary to have the shaft 18 rotate for more than one revolution any other suitable form of clutch may be employed in order to have the registering device operate correctly, such as a pawl and ratchet-wheel.

The operation of my improved testing device is as follows: The piece of paper or other sheet material is placed between the corrugated jaws or clamping members 5 and 6, and pressure is then brought to bear upon the members 1 and 2 of the hand-clamp. This causes the plates 5 and 6 to firmly grip and hold the sheet material circumferentially at that portion of the sheet material lying about the openings 7 and 8. A further movement of the members 1 and 2 of the hand-clamp toward each other then causes the casing 17 to telescope with the casing 22, thereby tending to force the upper end 13 of the plunger 12 against the sheet material clamped between the jaws 5 and 6. The pressure transmitted from the member 1 through the spring 32 will cause the plates to grip the sheet material with constantly-increasing force as the tension on the paper increases. However, the motion of the plunger 12 will be arrested by the tension of said sheet material until the spring 16 has been sufficiently compressed to produce such a pressure upon the sheet material to disrupt or tear the same. Owing to the fact that the plunger 12 is arrested in its movement by the tension of the paper or sheet material before disruption, while at the same time the casing 17 continues in its inward movement, motion will be transmitted to the shaft 18, which will thereby cause the hand 29 to travel over the face of the dial or scale 30. As soon as the disruption of the sheet material takes place the spring 16 will then cause the plunger 12 to be forced to the limit of its upward movement, thus returning the shaft 18 to its original position by reversing its motion; but owing to the fact that the connection between the shaft 18 and gear 36 has been discontinued said gear 36 is left in a position corresponding to the limit of movement of the plunger 12 in relation to the casing 17, which will cause the hand 29 to indicate such limit of movement on the scale 30. It will thus be seen that the plunger 12 by the action of the spring 16 produces an increasing tension upon the sheet material clamped between the plates 5 and 6 until such tension becomes great enough to disrupt or tear said sheet material; but this point will immediately and automatically be clearly indicated upon the scale 30. The openings 7 and 8 in the plates 5 and 6 are preferably made of a standard dimension or diameter, which I have adopted as a circle one inch in diameter. The semicircular head 13 of the plunger 12 is also made of a standard diameter and radius of curvature. In Fig. 5 I have indicated a spring-pressed finger 41, which rests against the periphery of the gear 36 for the purpose of preventing a too free movement of the gear 36 of the registering mechanism, thus preventing the momentum of the parts when in motion from causing the hand 29 to register inaccurately. However, it is obvious that any other frictional device for this purpose may be adopted.

In Fig. 6 I have shown a modified form of compression spring or springs for pressing the plunger 12 against the sheet material. This modified form consists of two springs 42 and 43 to be used in the place of spring 16. The spring 42 is much weaker than the spring 43 and being somewhat longer will act until the stop 15 has had sufficient movement to contact with the end of the spring 43, after which further movement of the spring 15 will be against the combined pressure of the springs 42 and 43. This arrangement is for the purpose of providing a delicate tension for very thin paper or other sheet material, which tension is increased when the movement of the casing 17 has reached a certain point, thus providing for the testing of paper or other sheet material of heavier grade. Of course the scale 30 should be so arranged that the first part of the same corresponds to the tension of the spring 42, while the remainder corresponds to the combined tensions of the springs 42 and 43.

Of course various changes may be made in the form or arrangement of my improved testing instrument without departure from the spirit and scope of my invention. For instance, the registering mechanism may be inclosed in any suitable casing and may be placed at any desirable point which will permit the requisite operative connection with the plunger or bar of the tension member; nor do I wish to be understood as being limited to the particular form of clamping members for the sheet material, the present form at this time being preferable, as the same clamps the sheet material in all directions circumferentially about the standard-opening and prevents the paper or other sheet material from starting to tear at its edge, which all sheet material has a tendency to do, thereby decreasing the accuracy of the measurement.

The means for determining and producing the pressure upon the material being tested may consist of different mechanical devices for producing the same result, such as by operating the pressure member by air or other fluid pressure in connection with a suitable indicator for the same.

Having thus described these forms of my invention, what I claim, and desire to protect by Letters Patent, is—

1. In a testing instrument, a hand-clamp having annular clamping-jaws, a tension device, said hand-clamp being connected with said tension device so that a single movement of said clamp will operate said jaws and said tension device, and means for registering the amount of pressure produced by said tension device.

2. In a testing instrument, a hand-clamp having annular clamping-jaws, a tension device acting within the openings in said jaws and carried by one of said jaws, said hand-clamp being connected with said tension device, said device comprising a spring and means for indicating the pressure produced by said tension device.

3. In a testing instrument, the combination comprising a portable hand-clamp, having annular jaws, a tension device, a spring connecting the parts of said clamp and acting to normally keep said jaws open and said tension device retracted, and means for registering the amount of pressure produced by said tension device.

4. A testing instrument of the class described, consisting of a hand-tool comprising opposed operating members adapted to be held in one hand and carrying annular clamping-jaws, a tension device connected with one of said members and including a compression-spring and means for registering the amount of pressure produced by said tension device.

5. A testing instrument of the class described, consisting of a hand-tool comprising opposed operating members adapted to be held in one hand and having clamping-jaws, a tension member, a casing carried by one of said jaws, through which said member passes, to form a guide for the end thereof, a coiled spring within said casing and surrounding said member, and means for registering the amount of pressure produced by said tension member.

6. In a testing instrument, a clamp, having annular clamping-jaws, telescopic casings carried by said clamp, a tension member located within said casings, a yielding connection between said member and one of said casings, said clamp being connected with said latter casing, and means for registering the amount of pressure produced by said tension member.

7. In a testing instrument, a clamp, having annular clamping-jaws, telescopic casings carried by said clamp, a tension member located within said casings, a yielding connection between said member and one of said casings, said clamp being connected with said latter casing, a spring for keeping said jaws separated and said casings extended, and means for registering the amount of pressure produced by said tension member.

8. In a testing instrument, annular clamping-jaws, a slidable casing carried by one of said jaws, a tension member located transversely of said jaws and provided with a gear-rack upon its outer end, a pinion meshing with said rack, a clutch connected with said pinion, a registering means carried by said casing and connected with said clutch, said clutch being adapted to operate said registering means when rotating in one direction.

9. In a testing instrument, a hand-clamp, comprising a pair of coacting clamping members provided with central openings or recesses of standard dimensions, a tension device slidably carried by one of said members and operating to produce a pressure upon sheet material clamped between said clamping members, said tension device being operatively connected with a hand-engaging portion of said clamp, registering mechanism connected with said tension device for indicating the greatest amount of pressure produced thereby upon the sheet material, and a spring tending to keep said tension device extended outwardly.

10. In a testing instrument, a clamp having a pair of clamping-jaws, adapted to hold sheet material rigidly in position, a movable member, carried by one of said jaws and adapted to produce pressure upon said sheet material, a pair of relatively slidable guides carried by said jaw, one of said guides being operatively connected with said movable member through the interposition of a compression-spring, a shaft carried by the latter guide, registering mechanism connected with said shaft, and operative connections between said shaft and said movable pressure member for causing said indicating mechanism to indicate the greatest tension of said spring during the relative movement of said guide.

11. In a testing instrument, a pair of clamp-operating members, movable toward and from each other in opposite directions, clamping-jaws connected with said members, a tension device also connected with one of said members for producing a tension upon the material clamped between said jaws, a spring connecting one of said clamp-operating members with one of said jaws to cause said tension device to be retracted, said clamp-operating member also acting to cause the tension member to bear against the material being tested, and a registering device to indicate the amount of the tension produced on said material.

12. In a testing instrument, a pair of clamping-jaws, having central openings or recesses therein, a pair of clamp-operating members connected with said jaws, a bar or plunger for producing pressure upon material clamped between said jaws and within said openings, one of said clamp-operating members being extended and connected with said bar or plunger, said connection comprising a spring for producing variable pressure upon said bar or plunger, and means for indicating the tension of said spring.

In witness whereof I have signed my name this 7th day of June, 1905.

FREDERICK H. SCHAUFFLER.

In presence of—
   WALTER S. JONES,
   EDW. W. VAILL, Jr.